United States Patent
Borghese et al.

(10) Patent No.: US 9,682,782 B2
(45) Date of Patent: Jun. 20, 2017

(54) PLATE-FIN TUBULAR HYBRID HEAT EXCHANGER DESIGN FOR AN AIR AND FUEL COOLED AIR COOLER

(71) Applicant: HONEYWELL INTERNATIONAL INC., Morristown, NJ (US)

(72) Inventors: Joseph B. Borghese, Yucca Valley, CA (US); Eric Blumer, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 295 days.

(21) Appl. No.: 14/560,801

(22) Filed: Dec. 4, 2014

(65) Prior Publication Data
US 2016/0161189 A1    Jun. 9, 2016

(51) Int. Cl.
| F28D 7/08 | (2006.01) |
| B64D 13/08 | (2006.01) |
| B64D 37/34 | (2006.01) |
| F28D 1/04 | (2006.01) |
| F28D 9/00 | (2006.01) |
| F28D 21/00 | (2006.01) |

(52) U.S. Cl.
CPC .............. *B64D 13/08* (2013.01); *B64D 37/34* (2013.01); *F28D 1/0461* (2013.01); *F28D 7/087* (2013.01); *F28D 9/0093* (2013.01); *F28D 2021/0021* (2013.01)

(58) Field of Classification Search
CPC ..... F28D 2021/0019; F28D 2021/0021; F28D 1/02; F28D 1/0477; F28D 1/0478

USPC ................................. 165/150, 164–166, 171
See application file for complete search history.

(56) References Cited

U.S. PATENT DOCUMENTS

| 2,212,912 | A | * | 8/1940 | Booth | F25B 39/02 165/168 |
| 2,214,057 | A | * | 9/1940 | Hull | F24F 3/1405 165/104.21 |
| 3,071,937 | A | * | 1/1963 | Smith | F25B 39/04 165/150 |
| 3,147,800 | A | * | 9/1964 | Tadewald | B21D 53/085 165/150 |
| 3,570,593 | A | * | 3/1971 | Isaaz | F28D 7/0041 165/166 |
| 4,787,443 | A | * | 11/1988 | Fukatsu et al. | F28D 7/0058 165/165 |
| 4,966,230 | A | * | 10/1990 | Hughes et al. | F28D 1/035 165/150 |
| 5,299,633 | A | * | 4/1994 | Bruggemann et al. | D06F 58/206 165/113 |
| 6,939,382 | B2 | | 9/2005 | Fessmann | |
| 8,079,407 | B2 | * | 12/2011 | Fellague et al. | B64D 13/00 165/140 |
| 2007/0101731 | A1 | | 5/2007 | Bayt | |

* cited by examiner

*Primary Examiner* — Allen Flanigan
(74) *Attorney, Agent, or Firm* — Shimokaji IP

(57) ABSTRACT

The present invention relates to apparatus and methods for exchanging heat between various fluids. More particularly, the present invention relates to apparatus and methods for exchanging heat between fuel, fan-air, and bleed-air in an integrated heat exchanger. Thereby, a weight and size of the integral heat exchanger are reduced compared to known non-integral heat exchangers. Advantageously, the heat exchanger may heat fuel to improve engine specific fuel consumption (SFC).

12 Claims, 3 Drawing Sheets

PLATE-FIN TUBULAR HYBRID HEAT EXCHANGER DESIGN FOR AN AIR AND FUEL COOLED AIR COOLER

BACKGROUND OF THE INVENTION

The present invention relates to apparatus and methods for exchanging heat between various fluids and, more particularly, apparatus and methods for exchanging heat between fuel, fan-air, and bleed-air in an integrated heat exchanger.

With development of de-oxygenated jet fuels, which is burned in engines, the fuel can be used for additional heat sink capacity by taking the fuel above normal coking limits of about 350° F. Using additional heat sink capacity of the fuel in lieu of fan-air can reduce required cooling air flow and reduce aircraft drag. Additionally, delivering higher temperature fuel to the combustors can improve engine specific fuel consumption (SFC).

One system within aircraft, which needs cooling and operates at higher temperatures, is an engine bleed air system. Typically ram air or engine fan air is used to cool the bleed air from around 1000° F. to under 400° F. By using engine fuel flow to cool the bleed air, the amount of ram or fan air used in cruise can be reduced with engine and aircraft performance benefits. A bleed air pre-cooler is normally sized for a ground or hold case where fuel flow is low such that there is still a need for air cooling of the bleed air.

Stainless steel or Inconel plate fin heat exchangers are typically used for bleed air pre-coolers because of the need for very compact designs. To reduce the risk of fuel leakage into the hot bleed air, double header bars plus a buffer passage have been used in other liquid to air plate fin designs. This imposes a large weight and/or size penalty due to the poor thermal conductance of the buffer passage.

SUMMARY OF THE INVENTION

In one aspect of the present invention, a heat exchanger includes a first bleed air passage; a second bleed air passage; a fan-air passage between the first and second bleed air passages; and a fuel tube in the fan-air passage.

In another aspect of the present invention, a heat exchanger includes a first bleed air passage; a second bleed air passage; a fan-air passage between the first and second bleed air passages; a serpentine-shaped fuel tube in the fan-air passage; and a tube sheet between each of the first and second bleed air passages and the fan-air passage.

In a further aspect of the present invention, a method of cooling bleed-air in a heat exchanger includes flowing bleed air through a first bleed air passage and a second bleed air passage; flowing fan air through a fan-air passage to enable heat exchange between the fan air and the bleed air; and flowing fuel through tubes within the fan-air passage to enable heat exchange between the fuel and the bleed air.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention provide integrating air and fuel cooling functions into one heat exchanging unit for cooling bleed air. Thereby, an associated bleed air system can be simplified with weight and/or size savings compared to using separate air cooled and/or fuel cooled pre-coolers.

The apparatus and methods of the present disclosure integrate air cooling passages and fuel cooling passages with bleed air passages into one heat exchanging unit. The fan air cooling circuit may be used when, for example, fuel flow is low such as when aircraft engines are at idle on the ground or when an aircraft is in a hold or descent condition. The fuel cooling circuit can be used, for example, when there is sufficient fuel flow and when the parasitic loss of fan air extraction or ram air usage should be avoided (e.g., as in long range aircraft cruise).

Figure 1A:
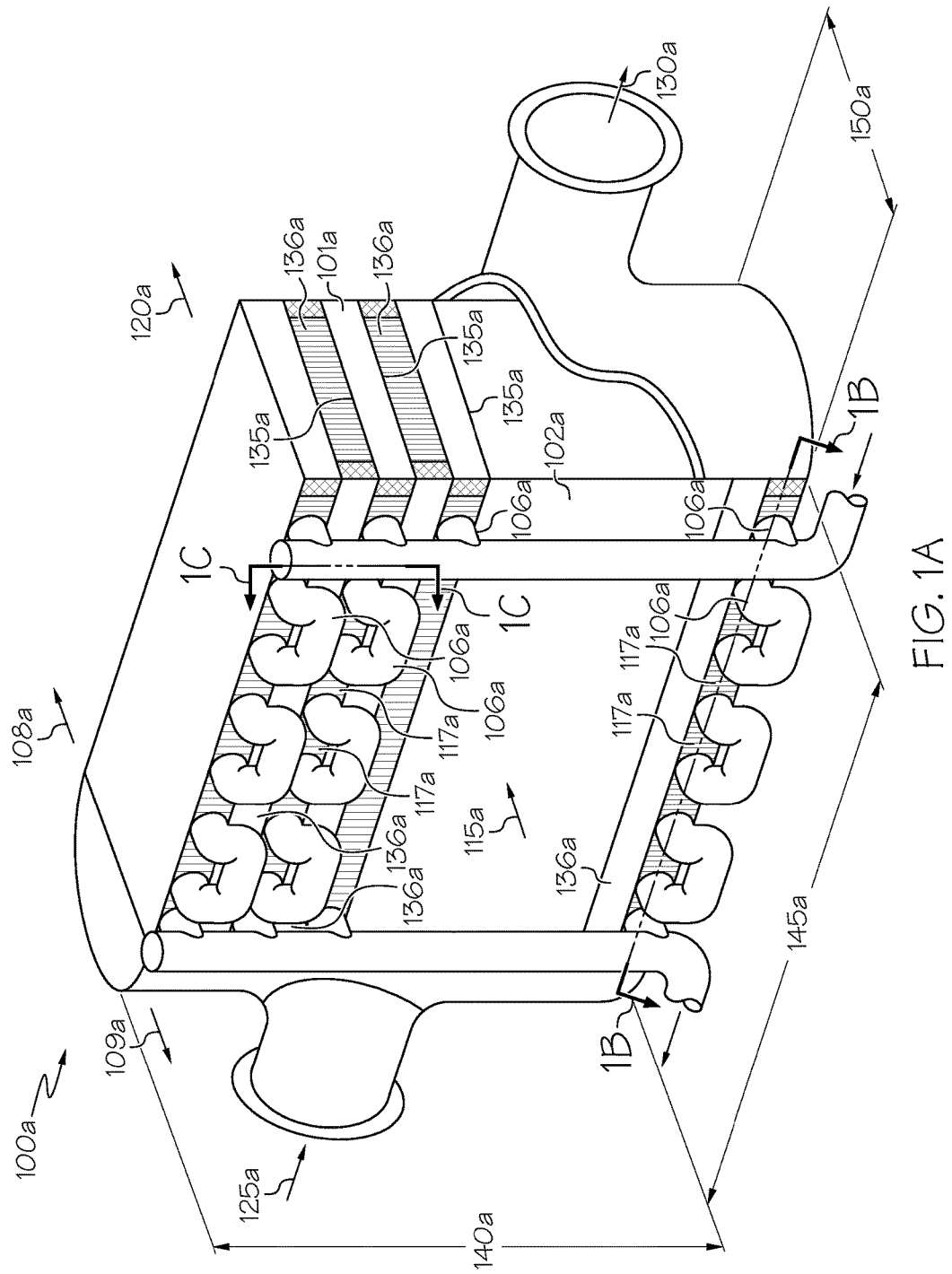
FIG. 1A depicts a perspective view of an integrated fuel-fan air-bleed air heat exchanger according to an exemplary embodiment of the present invention.

With reference to FIG. 1A, an example integrated fuel-fan air-bleed air heat exchanger 100a may include tube sheets 135a to separate fan-air passages 117a from bleed-air passages 136a. The heat exchanger 100a may further include fuel tubes 106a positioned within the fan-air passages 117a. Generally, the heat exchanger 100a may be, for example, configured to transfer heat from bleed-air, flowing through the bleed-air passages 136a, to fuel, flowing in the fuel tubes 106a, and/or to fan-air, flowing in the fan-air passages 117a. As illustrated in FIG. 1A, fan-air from the fan-air inlet 115a to the fan-air outlet 120a may flow at a ninety-degree angle with respect to bleed-air flow, from the bleed-air inlet 125a to the bleed-air outlet 130a. Further details of the integrated fuel-fan air-bleed air heat exchanger 100a are described below.

Figure 1B:
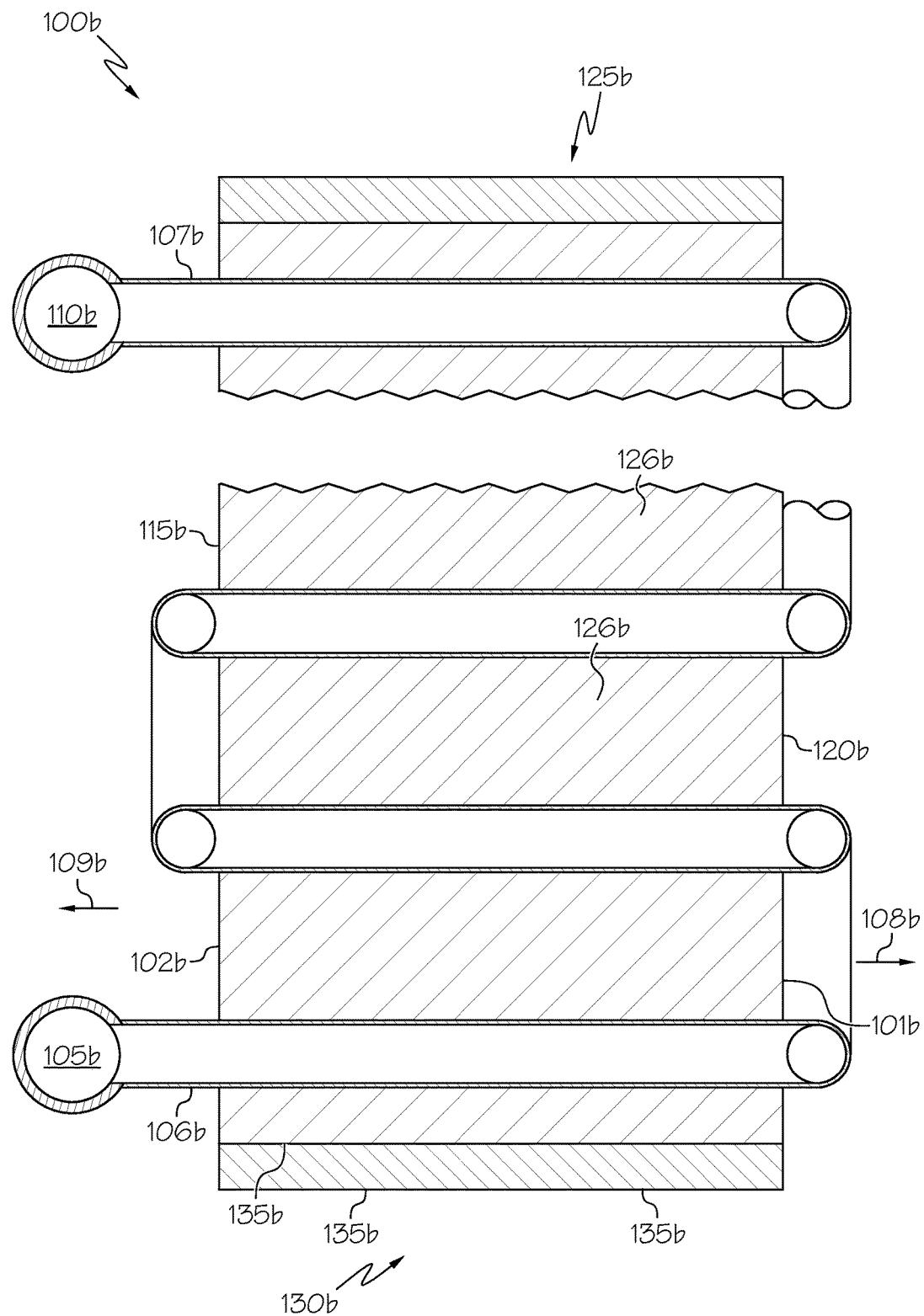
FIG. 1B depicts a sectional view, taken along line 1B-1B of FIG. 1A, of an integrated fuel-fan air-bleed air heat exchanger according to an exemplary embodiment of the present invention.

Turning to FIG. 1B, an example integrated fuel-fan air-bleed air heat exchanger 100b is depicted. The heat exchanger 100b may be similar to, for example, the heat exchanger 100a of FIG. 1A. In FIG. 1B, the integrated heat exchanger 100b may include a fuel inlet 105b connected to a fuel inlet manifold 106b, a fuel outlet 110b connected to a fuel outlet manifold 107b, a hot bleed-air inlet 125b, a cool bleed-air outlet 130b, a cool fan-air inlet 115b and a hot fan-air outlet 120b.

As illustrated in FIG. 1B, fan-air from the fan-air inlet 115b to the fan-air outlet 120b may flow at a ninety-degree angle with respect to bleed-air flow, from the bleed-air inlet 125b to the bleed-air outlet 130b. A first fan-air inlet plenum (not shown in FIG. 1B) may be connected to the fan-air inlet 115*b*, a second fan-air plenum (not shown in FIG. 1B) may be connected to the fan-air outlet 120*b*, a first bleed-air plenum (not shown in FIG. 1B) may be connected to the bleed-air inlet 125*b*, and a second bleed-air plenum (not shown in FIG. 1B) may be connected to the bleed-air outlet 130*b*. Any one of, or all of, the plenums may include a flow regulator (as known in the art), and may be used to control fan-air flow or bleed-air flow through the heat exchanger 100*b*.

Figure 1C:
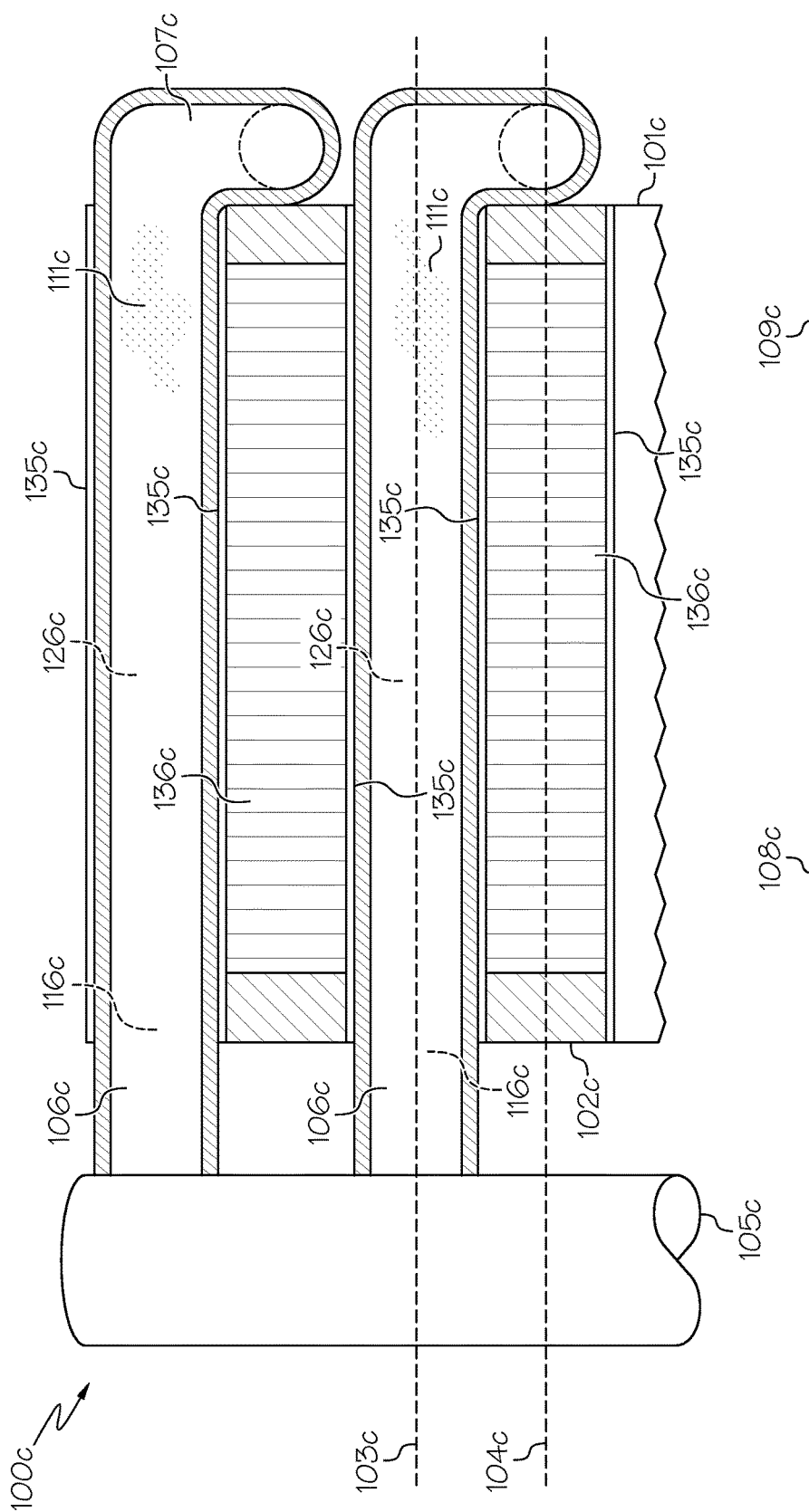
FIG. 1C depicts a sectional view, taken along line 1C-1C of FIG. 1A, of an integrated fuel-fan air-bleed air heat exchanger according to an exemplary embodiment of the present invention.

With reference to FIG. 1C, details of three fluid passages (e.g., fuel tubes 106*c*, bleed-air passages 136*c* and fan-air passages 116*c*) within an example integrated fuel-fan air-bleed air heat exchanger 100*c* are depicted. One or more fuel tubes 106*c* may be integrated into one or more cooling fan-air passages 116*c*. Notably, FIG. 1C is a section through the fuel tube 106*c* such that the fan air passage 116*c* is not visible. Thus, lead lines associated with the reference number 116*c* are shown as dashed lines in FIG. 1C. A fuel tube 106*c* may have a serpentine configuration and, thus, may extend in a first direction 108*c* from a first end 101*c* to a second end 102*c*; and may extend in a second direction 109*c* from the second end 102*c* to the first end 101*c*. The second direction 109*c* may be, for example, opposite to the first direction 108*c*, within the cooling air passage 116*c*. Thereby, fan air flow, through a fan-air passage 116*c* may be directed in the first direction 108*c*, from the first end 101*c* to the second end 102*c*, or may be directed in the second direction 109*c*, from the second end 102*c* to the first end 101*c*, depending on how the heat exchanger 100*c* is oriented within an associated system (not shown in FIG. 1C).

As can be seen in FIG. 1C, a fan-air flow plane 103*c* is defined at a center of the fan-air passage 116*c*. As can be appreciated, any object (such as, for example, a turning elbow 107*c*) that is located at the first end 101*c* or the second end 102*c* of the heat exchanger 100*c*, in the fan-air flow plane 103*c*, can at least partially block the fan-air passage 116*c*. A bleed-air flow plane 104*c* can be defined at a center of the bleed-air passage 136*c*.

If a serpentine configuration is used, a fuel tube 106*c* may include turning elbows 107*c* proximate a first end 101*c* and/or turning elbows (not shown in FIG. 1C) proximate a second end 102*c* of the heat exchanger 100*c*. In order to avoid blockage of the fan-air passages 116*c* when a serpentine fuel tube 106*c* configuration is used, the turning elbows 107*c* may be, for example, bent out of the fan-air flow plane 103*c* of the respective fan-air passage 116*c* proximate the first end 101*c* such that the turning elbows 107*c* do not block fan-air flow through the respective fan-air passage 116*c*. As illustrated in FIG. 1C, the fuel tube 106*c* and/or the turning elbows 107*c* may be bent perpendicular to the fan-air flow plane 103*c*, for example, into a bleed-air flow plane 104*c* alongside a bleed-air passage 136*c* on the first end 101*c*. Accordingly, as shown in FIG. 1C, the fuel tube 106*c* has substantially straight portions lying in a common plane 103*c*, and with turning elbows 107*c* connecting the substantially straight portions disposed the proximate first end 101*c* and the second end 102*c* of the fan-air passage 116*c*, the turning elbows being angled relative to the common plane such that they do not lie in the common plane, whereby the fan-air passage is not occluded by the turning elbows.

Additionally, turning elbows (not shown in FIG. 1C) may be bent out of the fan-air flow plane 103*c* of the respective fan-air passage 116*c* at a second end 102*c* of the heat exchanger 100*c* such that the respective turning elbows (not shown in FIG. 1C) are not located in the fan-air flow plane 103*c* of the respective fan-air passage 116*c*. For example, the turning elbows (not shown in FIG. 1C) proximate the second end 102*c* may be configured as described with regard to the elbows 107*c*.

A fuel tube 106*c* may be welded to a fuel inlet manifold 105*c* and/or a fuel outlet manifold 110*c* (not shown in FIG. 1C). Using a single, continuous, fuel tube 106*c* within a cooling fan-air passage 116*c* limits the number of fuel tube 106*c* joints aside from fuel tube/manifold welds.

A fuel tube 106*c* may be slightly flattened, for example, in a press to provide sufficient land for brazing the fuel tube 106*c* to corresponding tube sheets 135*c*. This increased tube land, in comparison to fuel tubes 106*c* without a tube land, may provide additional thermal contact area to reduce conduction resistance from a hot bleed-air passage 136*c* to a fuel tube 106*c*.

Any fan-air passage 116*c* may be filled with fin material 126*c* to improve heat transfer conductance between the fan-air passages 116*c* and the bleed-air passages 136*c*. FIG. 1C is a sectional view through the fuel tubes 106*c* and, as discussed above the fan-air passages 116*c* are not visible. Similarly, the fin material 126*c* is not visible. Thus, the lead lines associated with reference number 126*c* are shown as dashed lines in FIG. 1C. The fin material 126*c* may be made of, for example, the same material as a fuel tube 106*c* and/or a tube sheet 135*c* (e.g., steel or nickel alloy, metal, a fiber material, a metal alloy, etc.).

While the fuel tubes 106*c* and the fin material 126*c* are shown in FIG. 1C as being equally spaced throughout the heat exchanger 100*c*, spacing of the fuel tubes 106*c* and/or the fin material 126*c* may be varied within the heat exchanger 100*c* to provide increased cooling in, for example, a center area of the heat exchanger 100*c*.

A heat exchanger of the present disclosure may use multiplassed fuel tubes 106*c* to contain fuel, and the fuel tubes 106*c* may be directly connected thermally to hot bleed-air passages 136*c* by, for example, welding or brazing the fuel tube 106*c* to tube sheets 135*c*. The fuel tubes 106*c* may be directly integrated into the fan-air passages 116*c* by, for example, co-molding or extruding the fuel tubes 106*c* along with associated tube sheets 135*c*, such that two cold fluids (e.g., fuel and fan-air) transfer heat from the hot bleed-air passages 136*c*.

A fuel tube 106*c* within a fan-air passage 116*c* may be formed, from one continuous tube, into a serpentine arrangement such that the only joints in the fuel tubes 106*c* are the connections to the inlet and outlet fuel manifolds 105*b*, 110*b*. Thereby, potential fuel leakage is minimized. Connections between the fuel tubes 106*c* and the inlet and outlet fuel manifolds 105*b*, 110*b* may be defined by welding the fuel tubes 106*c* to the inlet and outlet fuel manifolds 105*b*, 110*b*.

Dimples 111*c* may be formed on a fuel tube 106*c*, either ring dimples or side dimples, to disturb the fuel boundary layer and promote wall to bulk mixing of the fluid in order to enhance the fuel side heat transfer.

In a non-limiting application, an integrated fuel-fan air-bleed air heat exchanger 100*a* may, for example, be incorporated into a business jet bleed-air pre-cooler. In such a non-limiting specific example, a pre-cooler core fan-air fin height may be increased from 0.178 inches, for a heat exchanger that does not have fuel tubes incorporated with fan-air passages, to 0.25 inches, for a heat exchanger that has fuel tubes incorporated with fan-air passages. Fin count may be increased from twelve, for a heat exchanger that does not have fuel tubes incorporated with fan-air passages, to thirteen or more for a heat exchanger that has fuel tubes incorporated with fan-air passages. Fin thickness may be increased from 0.003 inches, for a heat exchanger that does not have fuel tubes incorporated with fan-air passages, to 0.004 inches for a heat exchanger that has fuel tubes incorporated with fan-air passages. Fin height, fin count and/or fin thickness may be varied to meet performance requirements as hot bleed-air flow length and/or fuel tubes 106a are varied.

In a specific non-limiting example, by integrating fuel tubes 106a within fan-air passages 117a, an integrated heat exchanger 100a may include two hundred and twenty (end-to-end fuel tube passes), with 0.25 inch diameter fuel tubes 106a, within a space similar to a space associated with a non-integrated heat exchanger. In another specific non-limiting example, an integrated heat exchanger 100a may deliver bleed-air temperature output, Thot_out=250 F, in a fuel cooled case with fuel temperature output, Tfuel out=311 F. In a further non-limiting example, an integrated heat exchanger may include a length 145a, Lhot=12.9 inches, a width 150a, Lcold=9.0 inches, and a height 140a, Lno=8.12 inches. In yet another specific non-limiting example, a core weight of an integrated heat exchanger 100a-c may be, wt=52 lb., and a unit weight may be, Unit wt=74 lb.

This disclosure is generally intended for describing a three-fluid heat exchanger such as fuel/bleed air/fan air. The design may overcome the usual problem with three-fluid heat exchangers by integrating tubes for high-temperature/high-pressure fuel with fan-air passages thus eliminating a need for buffer passages that result in significant size and/or weight penalties. The intended application enables bleed-air cooling by fan-air and/or fuel as appropriate. Fuel cooling harvests the heat instead of wasting it. The design may also provide additional separation between the fuel and hot bleed air circuits.

It should be understood, of course, that the foregoing relates to exemplary embodiments of the invention and that modifications may be made without departing from the spirit and scope of the invention as set forth in the following claims.

What is claimed is:

1. A heat exchanger, comprising:
   a first bleed air passage;
   a second bleed air passage;
   a fan-air passage between the first and second bleed air passages; and
   a fuel tube in the fan-air passage wherein the fuel tube is a continuous tube in a serpentine shape with substantially straight portions lying in a common plane, and with turning elbows connecting said substantially straight portions disposed proximate a first end and a second end of the fan-air passage, said turning elbows being angled relative to said common plane such that they do not lie in said common plane, whereby the fan-air passage is not occluded by the turning elbows.

2. The heat exchanger of claim 1, further comprising a respective tube sheet between each of the bleed air passage and the fan-air passage.

3. The heat exchanger of claim 1, wherein the fuel tube includes one of: ring dimples or side dimples.

4. A heat exchanger, comprising:
   a first bleed air passage;
   a second bleed air passage;
   a fan-air passage between the first and second bleed air passages;
   a fuel tube in the fan-air passage, wherein the fuel tube is a continuous tube in a serpentine shape with substantially straight portions lying in a common plane, and with turning elbows connecting said substantially straight portions disposed proximate a first end and a second end of the fan-air passage, said turning elbows being angled relative to said common plane such that they do not lie in said common plane, whereby the fan-air passage is not occluded by the turning elbows; and
   a tube sheet between each of the first and second bleed air passages and the fan-air passage.

5. The heat exchanger of claim 4, wherein the fuel tube is affixed to a fuel inlet manifold and a fuel outlet manifold.

6. The heat exchanger of claim 4, wherein the fuel tube includes at least one of: steel or nickel alloy.

7. A method of cooling bleed-air in a heat exchanger, comprising:
   flowing bleed air through a first bleed air passage and a second bleed air passage;
   flowing fan air through a fan-air passage to enable heat exchange between the fan air and the bleed air; and
   flowing fuel through a tube within the fan-air passage to enable heat exchange between the fuel and the bleed air, wherein the tube is a continuous tube in a serpentine shape with substantially straight portions lying in a common plane, and with turning elbows connecting said substantially straight portions disposed proximate a first end and a second end of the fan-air passage, said turning elbows being angled relative to said common plane such that they do not lie in said common plane, whereby the fan-air passage is not occluded by the turning elbows.

8. The method of claim 7, wherein heat is transferred from the bleed-air to either the fuel or the fan-air.

9. The method of claim 8, wherein heat is transferred from the bleed-air to the fan-air.

10. The method of claim 7, wherein heat is transferred from the bleed-air to both the fuel and the fan-air.

11. The method of claim 7, wherein heat is transferred from the bleed-air to the fuel.

12. The method of claim 7, wherein heat is transferred from the bleed-air to the fan-air.

* * * * *